United States Patent
Yarvis et al.

(10) Patent No.: US 9,521,126 B2
(45) Date of Patent: Dec. 13, 2016

(54) PROCESSING DATA PRIVATELY IN THE CLOUD

(71) Applicant: Intel Corporation, Santa Clara, CA (US)

(72) Inventors: Mark D. Yarvis, Portland, OR (US); Joshua Boelter, Portland, OR (US); Sharad K. Garg, Portland, OR (US); Hong Li, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/124,742

(22) PCT Filed: Aug. 21, 2013

(86) PCT No.: PCT/US2013/055915
§ 371 (c)(1),
(2) Date: Dec. 9, 2013

(87) PCT Pub. No.: WO2015/026336
PCT Pub. Date: Feb. 26, 2015

(65) Prior Publication Data
US 2015/0058629 A1    Feb. 26, 2015

(51) Int. Cl.
*H04L 29/06*    (2006.01)
(52) U.S. Cl.
CPC ......... *H04L 63/045* (2013.01); *H04L 63/0428* (2013.01); *H04L 63/0435* (2013.01); *H04L 63/0442* (2013.01); *H04L 63/061* (2013.01)
(58) Field of Classification Search
None
See application file for complete search history.

(56) References Cited

U.S. PATENT DOCUMENTS

| | | | | |
|---|---|---|---|---|
| 8,312,518 B1 * | 11/2012 | Ezell | ...................... | G06F 21/33 726/4 |
| 8,331,568 B2 | 12/2012 | Ferguson | | |
| 8,452,017 B2 | 5/2013 | Sherkin | | |
| 8,458,494 B1 * | 6/2013 | Bogorad | ................... | H04L 9/30 380/282 |
| 8,578,167 B2 | 11/2013 | Miyamoto | | |
| 8,782,774 B1 * | 7/2014 | Pahl | ...................... | H04L 9/0825 709/237 |

(Continued)

FOREIGN PATENT DOCUMENTS

| WO | WO 0169843 A2 * | 9/2001 |
|---|---|---|
| WO | 01-69843 | 9/2011 |

OTHER PUBLICATIONS

PCT International Search Report and Written Opinion issued in corresponding PCT/US2013/055915 dated May 21, 2014, (13 pages).

*Primary Examiner* — Andrew Nalven
*Assistant Examiner* — Christopher Ruprecht
(74) *Attorney, Agent, or Firm* — Trop Pruner & Hu, P.C.

(57) ABSTRACT

While cloud services can offer processing from personal devices or synthesized data from multiple sources, many users prefer their data to remain private. According to some embodiments, private user data may be processed in the cloud without revealing the user identity to the cloud service provider. Only the user or an authorized agent of the user and the service's hardware platform have access to certain keys. The service application software and operating system only have access to encrypted data.

20 Claims, 8 Drawing Sheets

(56) References Cited

U.S. PATENT DOCUMENTS

| | | | | |
|---|---|---|---|---|
| 8,839,004 B1* | 9/2014 | Bennett | G06F 21/575 | 713/189 |
| 8,842,841 B2* | 9/2014 | Hook et al. | | 380/284 |
| 9,270,449 B1* | 2/2016 | Tribble | H04L 63/0435 | |
| 9,306,946 B1* | 4/2016 | Osburn | H04L 63/0428 | |
| 2003/0159029 A1* | 8/2003 | Brown | G07B 17/00193 | 713/151 |
| 2004/0034772 A1* | 2/2004 | Alao | H04L 9/0844 | 713/168 |
| 2006/0182282 A1* | 8/2006 | Negahdar | H04L 9/0825 | 380/277 |
| 2011/0231650 A1* | 9/2011 | Coulier | | 713/151 |
| 2012/0084544 A1* | 4/2012 | Farina | G06F 21/575 | 713/2 |
| 2012/0284506 A1* | 11/2012 | Kravitz | G06Q 40/00 | 713/151 |
| 2012/0284513 A1* | 11/2012 | Yerli | | 713/168 |
| 2013/0124860 A1* | 5/2013 | Maidl | G06F 21/6263 | 713/164 |
| 2013/0124866 A1* | 5/2013 | Farrugia | H04L 9/0822 | 713/171 |
| 2013/0151848 A1* | 6/2013 | Baumann | H04L 9/3263 | 713/164 |
| 2013/0185558 A1* | 7/2013 | Seibert | H04L 9/3263 | 713/168 |
| 2013/0254537 A1* | 9/2013 | Bogorad | H04L 9/0822 | 713/165 |
| 2014/0019753 A1* | 1/2014 | Lowry | H04L 63/062 | 713/155 |
| 2014/0022586 A1* | 1/2014 | Zehler | | 358/1.14 |
| 2014/0075184 A1* | 3/2014 | Gorbach | H04L 63/06 | 713/155 |
| 2014/0082364 A1* | 3/2014 | Cucinotta | H04L 9/0825 | 713/171 |
| 2014/0096182 A1* | 4/2014 | Smith | H04L 9/0872 | 726/1 |
| 2014/0143543 A1* | 5/2014 | Aikas | H04L 67/1097 | 713/168 |
| 2014/0195818 A1* | 7/2014 | Neumann | G06F 21/6209 | 713/189 |
| 2014/0245025 A1* | 8/2014 | Fairless | G06F 21/602 | 713/189 |
| 2014/0245384 A1* | 8/2014 | Shieh | G06F 21/44 | 726/2 |
| 2014/0250017 A1* | 9/2014 | Khan | G06Q 20/3829 | 705/71 |
| 2014/0281477 A1* | 9/2014 | Nayshtut | H04L 9/0825 | 713/150 |
| 2014/0281510 A1* | 9/2014 | Buruganahalli | H04L 63/1408 | 713/164 |
| 2014/0281531 A1* | 9/2014 | Phegade et al. | | 713/168 |
| 2014/0337234 A1* | 11/2014 | Tang | H04L 9/3265 | 705/71 |
| 2015/0012751 A1* | 1/2015 | Forster | H04L 9/30 | 713/171 |
| 2015/0089589 A1* | 3/2015 | Cucinotta | G06F 21/602 | 726/3 |
| 2015/0113279 A1* | 4/2015 | Andersen | H04L 63/0457 | 713/171 |
| 2015/0143118 A1* | 5/2015 | Sheller | H04L 9/3223 | 713/168 |
| 2015/0294117 A1* | 10/2015 | Cucinotta | G06F 21/74 | 713/189 |
| 2016/0148001 A1* | 5/2016 | Bacher | G06F 9/45558 | 713/189 |

\* cited by examiner

PROCESSING DATA PRIVATELY IN THE CLOUD

BACKGROUND

This relates generally to processing data in the cloud.

The cloud is basically any server that provides storage or processing services to clients such as mobile phones, laptop computers, personal computers, and in fact any processor-based device that can communicate with a server over a wired or wireless network. Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

Generally, a variety of tasks are provided from clients to servers. A common task in connection with Apple iPhones is to use the Siri voice recognition service. The user can speak a question and that information is processed by a server that then provides an answer.

Some people would prefer that the cloud service provider not access the data that is being processed. That data could include the user's voice, any other user privacy data, as well as the actual content that the user is providing. However, the user has little choice in many cases because the phone provider is also the one that provides the cloud service.

BRIEF DESCRIPTION OF THE DRAWINGS

Some embodiments are described with respect to the following figures.

DETAILED DESCRIPTION

While cloud services can offer processing from personal devices or synthesized data from multiple sources, many users prefer their data to remain private. According to some embodiments, private user data may be processed in the cloud without revealing the user identity to the cloud service provider. Only the user or an authorized agent of the user and the service's hardware platform have access to certain keys and, thus, unencrypted data. The service application software and operating system only have access to encrypted data.

According to one embodiment, a trusted computing base in a cloud service enables the service to process user data privately. Data may be stored and transmitted in an encrypted format only. Processing of clear text data may only occur within trusted hardware components in the cloud service. The cloud service operating system application software only has access to encrypted data.

Figure 1:
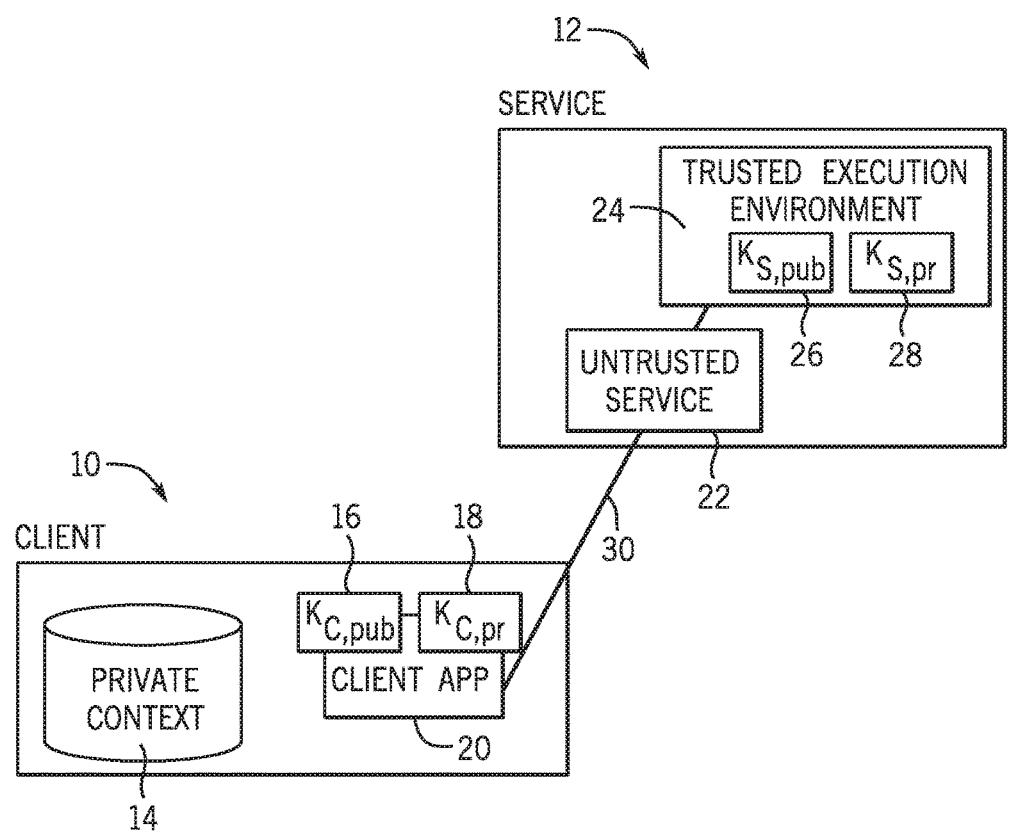
FIG. 1 is an architecture view of a client server in accordance with one embodiment.

Referring to FIG. 1, a client 10 may communicate over a communication path 30 with a service or server 12. The communication path 30 may be any wired or wireless communication path. The client 10 may be any processor-based device including a tablet, a cellular telephone, a laptop computer or a personal computer. It may also be a television receiver, printer game device or wearable device. The client 10 includes a private context 14 that may include information and applications which the user prefers to maintain confidentiality. It may also include a plurality of client applications 20, each of which has their own assigned public keys 16 and private keys 18.

The communication path 30 in one embodiment may implement a transport layer security (TLS) connection, for example, in connection with a hypertext transfer protocol secure (HTTPS) protocol. The TLS connection may be established by the client to a trusted execution environment 24 within the service 12. For example, in one embodiment, the communication over the TLS connection 30 may rely on a certificate exchange that assures the client that the trusted execution environment is a particular trusted execution environment. The client may store a list of execution environments accepted as trusted. For example a Verisign certificate may provide sufficient information to the client that the client can be sure of the identity of the trusted execution environment. Then the client need only check a database to determine whether the trusted execution environment is one that the client may trust.

A certificate may be generated by a service (such as Verisign), which assures the user that the entity with which it is communicating is the one that the entity says it is.

The service 12 may include an untrusted service 22 through which the path 30 passes to reach the trusted execution environment 24. However, the untrusted service only has access to encrypted data. Only the trusted execution environment 24 has the public keys 26 and private keys 28, needed for private delivery of user data from client 10 to the trusted execution environment 24. The untrusted service may, for example, be an Internet service provider or a cellular telephone service provider, as two examples.

Figure 2:
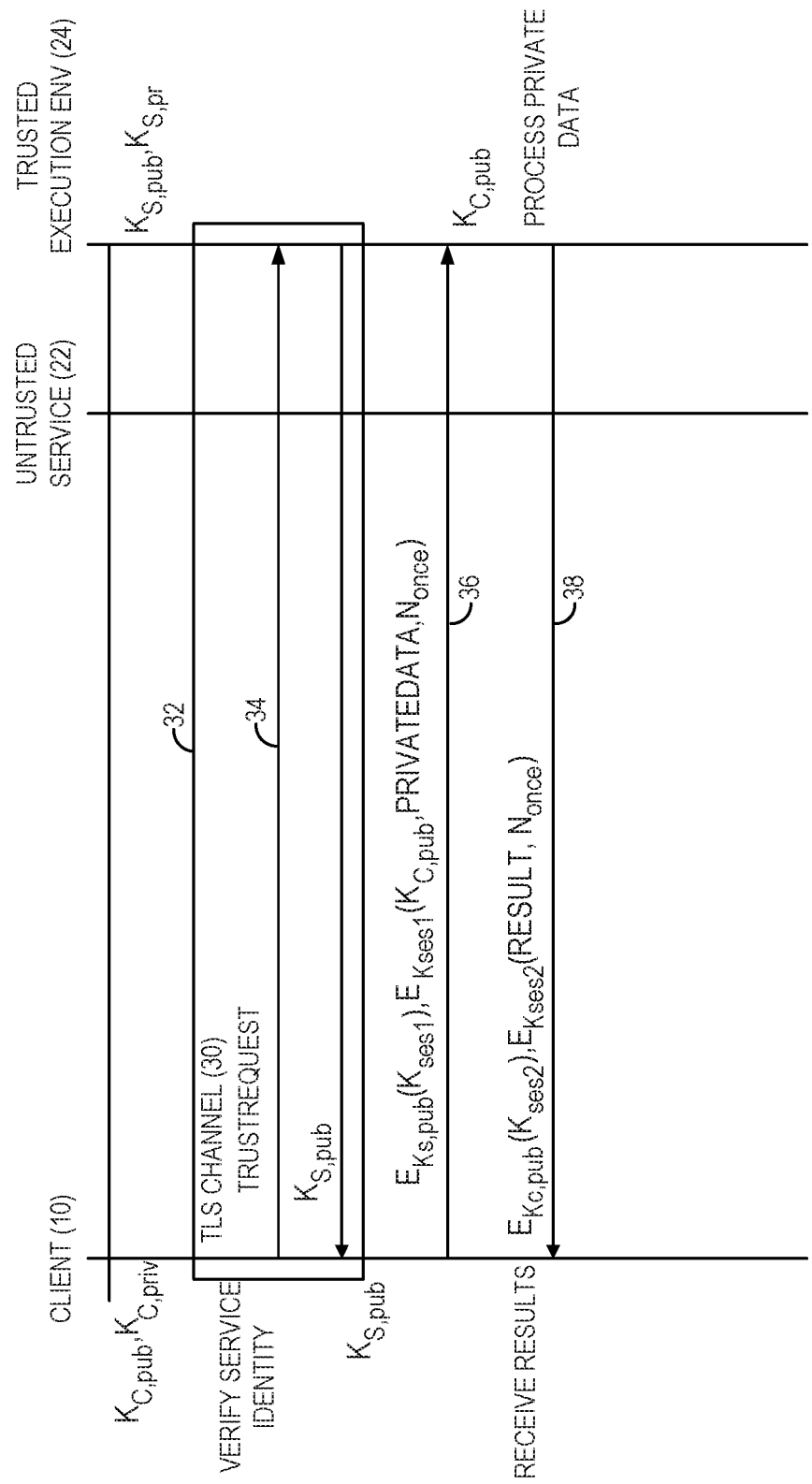
FIG. 2 is a communication flow in accordance with one embodiment.

Thus, referring to FIG. 2, a client 10 may communicate with the trusted execution environment 24 through the untrusted service 22. The client 10 includes public and private keys and verifies the trusted execution environment's identity using a TLS channel 30. Particularly a trust request 32 is issued to the trusted execution environment. The trusted execution environment responds with its public key, as indicated by arrow 34. Then the client determines whether or not the trusted execution environment is one that the client is able to trust based on a list of preordained trusted execution environments. It can be sure of the identity of the trusted execution environment because this identity is confirmed by a TLS channel.

Then, if the client 10 chooses to have private data processed by the trusted execution environment 24, it sends a message including a session key, encrypted with the public key of the server and a public key of the client, together with private data and a nonce encrypted with the session key, as indicated by the arrow 36. Then the trusted execution environment 24 has the client's public key and may process the private data. It sends the results as indicated at 38 to the client 10. The results and the nonce are encrypted using a second session key. The session key is also encrypted using the client's public key.

The service receives the private data from the client and performs the processing in the trusted execution environment. Only the trusted execution environment has keys to decrypt the data, which was otherwise encrypted in memory and on disk. Once processing is complete, the results are encrypted using a second session key. The second session key, encrypted by the client public key, the results and nonce encrypted by the second session key are returned to the client.

Figure 3:
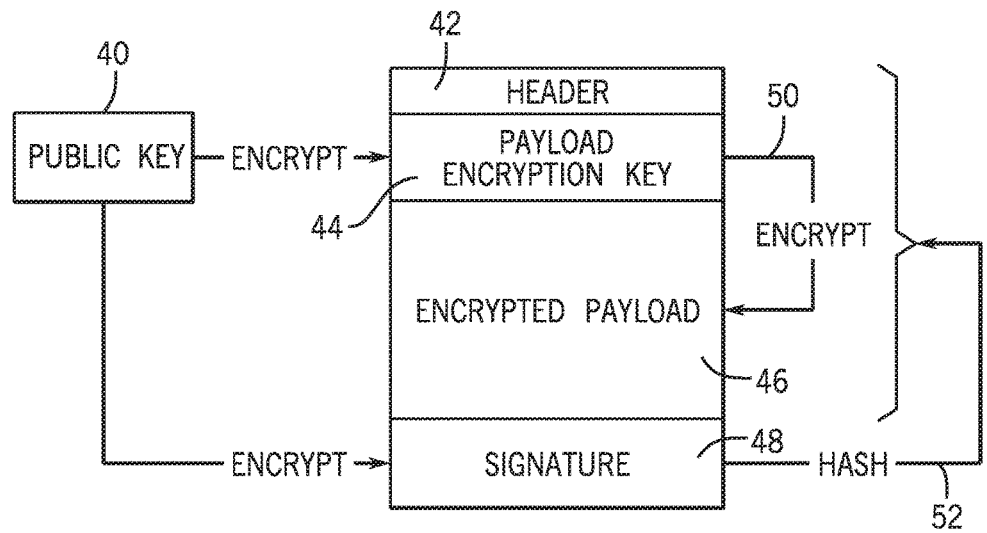
FIG. 3 is a depiction of a packet format useful in one embodiment.

FIG. 3 shows one possible packet format. The public key 40 is used with the payload encryption key 44 to encrypt the signature 48. Thus, the payload 46 is encrypted and then a header 42 may be provided. Namely the payload is encrypted using the payload encryption key 44 as indicated at 50. The signature then may be hashed, as indicated at 52, with the header, encryption key 44, and payload 46.

Figure 4:
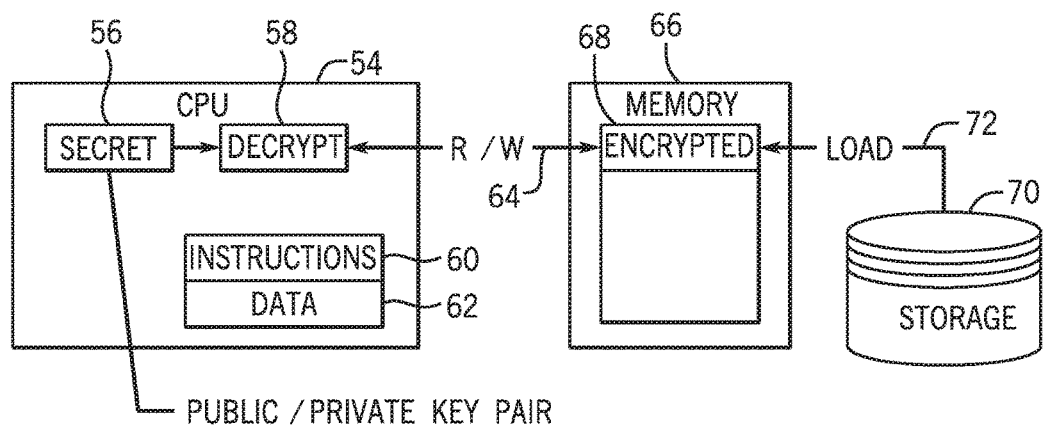
FIG. 4 is a depiction of a trusted execution environment according to one embodiment.

A trusted execution environment shown in FIG. 4 is the key to secure processing by the server. All data received from the client is stored in an encrypted form in memory 66 and on storage 70. The trusted execution environment contains the secret key used to decrypt the data and memory 66 for processing. The decrypted data is only available during processing and never in the memory or on disk after it is processed.

Thus, a central processing unit (CPU) or other processor 54 includes the secret 56 which is a public private key pair or symmetric key. It can be used for decryption in decryption unit 58 which provides instructions 60 in data 62. A read-write link 64 links the memory 66 and the CPU 54. The memory 66 may store encrypted information 68 which may be also be loaded from the storage 70 as indicated in 72.

So far, data has been transmitted from the client with an algorithm or without an algorithm (e.g. personal context as an encrypted text file) for operating on the data residing on the server. In another embodiment, the client delivers both data and instructions for execution on the server. In this case, the client is able to control both access to data as well as the processing that occurs on the data. The processing instructions are transmitted along with the data in the block marked "private data" in FIG. 2 and "encrypted payload" in FIG. 3. The server can be protected either by requiring that the instructions be signed or that the instructions be interpreted in a sandbox (e.g. Java Virtual Machine), running in the trusted execution environment or both.

In the examples described so far, there is an end user and a single service provider whose servers have a trusted execution environment. Two extensions are described hereinafter.

Figure 5:
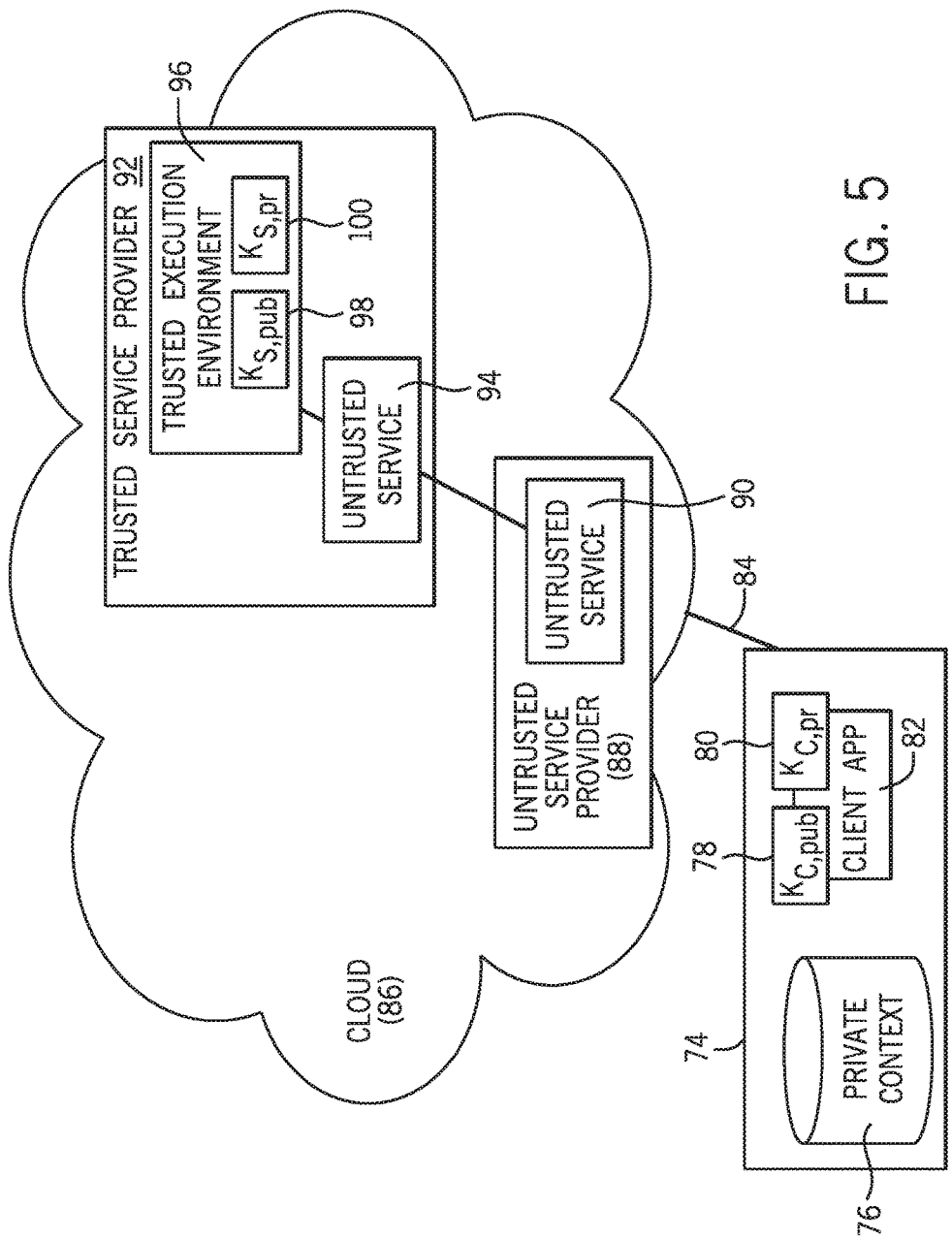
FIG. 5 is a depiction of an architecture using a third party trusted service provider according to one embodiment.

In some cases, the user may interact with a service provider that the user does not trust even if the service provider has hardware with a trusted execution environment. In this case, a trusted third party may be used as shown in FIG. 5. The user establishes a relationship with the trusted third party's hardware, rather than with the untrusted service provider. The computation occurs in the third party trusted hardware and only an encrypted request and result data are transmitted through the untrusted service provider.

Thus, in FIG. 5, the client device 74 includes public and private keys 78 and 80, a client application 82, and a private context 76. The device 74 communicates over the path 84 which may be wired or wireless and may typically be a TLS connection. It communicates with the untrusted service provider 88 which has the untrusted service 90. The untrusted service provider and the trusted service provider 92 are both in the cloud 86. The trusted service provider 92 includes the untrusted service 94, public and private keys 98 and 100, and trusted execution environment 96.

Figure 6:
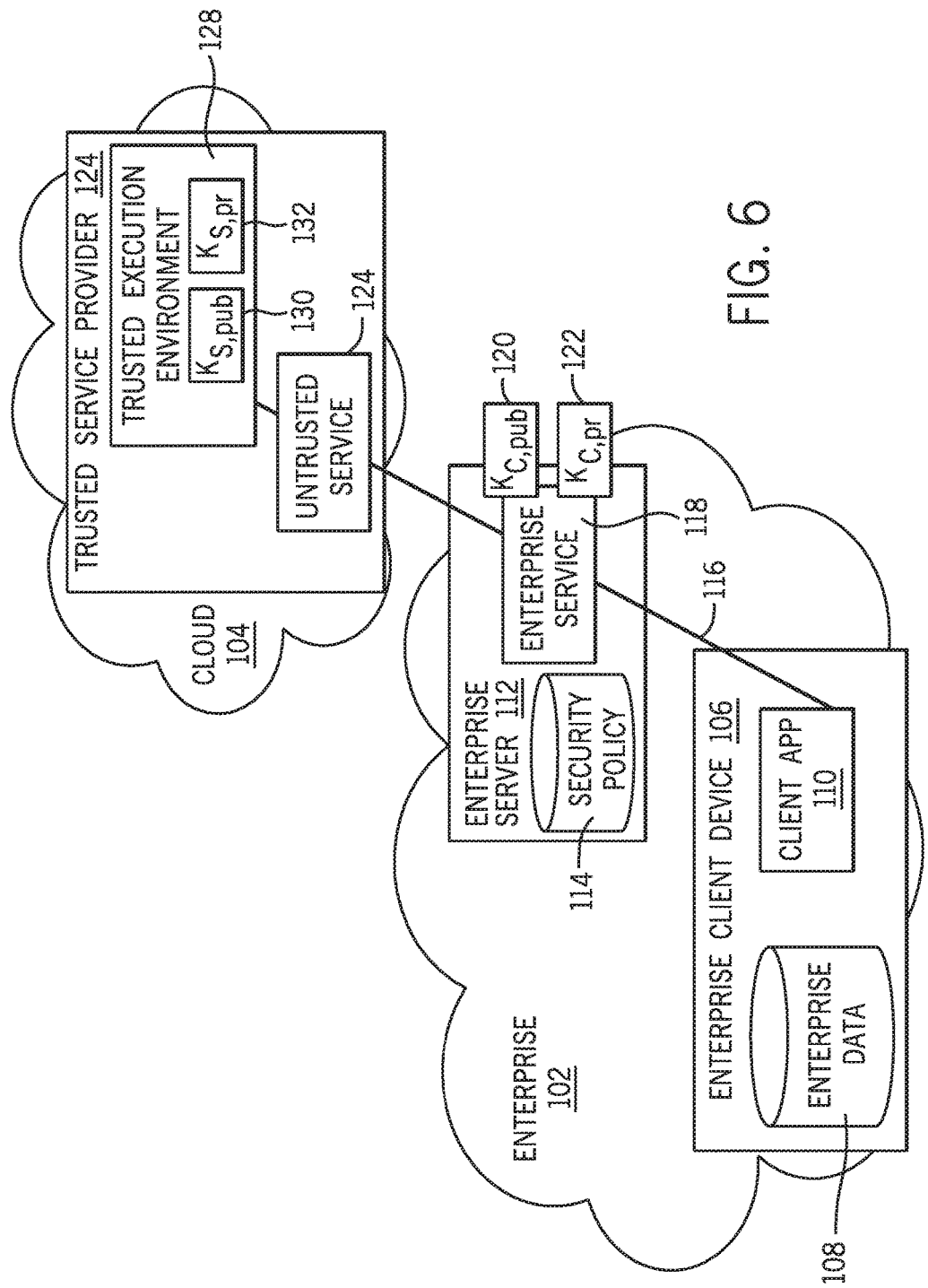
FIG. 6 is an architecture depiction of a trusted service provider from within an enterprise.

In another example, shown in FIG. 6, the client may be a device in an enterprise environment. In this example, the enterprise 102 may wish to have access to the unencrypted data. In addition, the enterprise may wish to set policy as to what data may be processed and by what external service provider. In this case, the enterprise client device 106 communicates with the trusted service provider 124 through an enterprise service or server 112 or perhaps a proxy provided by the enterprise. The enterprise service 112 contains the appropriate security policy 114 and negotiates the trust relationship and keys with the trusted execution environment 128. Thus, the enterprise client device 106 includes the enterprise data 108 and the client application 110 that communicates via path 116 within the enterprise 102 with the enterprise server 112. The enterprise server 112 has the security policy for cloud processing of data and the enterprise service 118 with public and private keys 120 and 122. The trusted execution environment 128 also includes public and private keys 130 and 132 within the cloud 104.

Thus, the enterprise client device 106 communicates over the path 116 with the enterprise server 112 within the enterprise 102. It also communicates over the path 116 with the cloud 104 and the trusted execution environment 128 via the untrusted service 124.

In some embodiments, the session keys may be random numbers and the nonce may be another random number. The session key may for example be a symmetrical key.

In some embodiments, data may be processed in the cloud in a way that preserves its privacy. The service provider may never know the identity of the client device's owner or even the data that is being provided. Data execution may be separated from an untrusted service provider.

Any client application that has a public/private key pair can be used in embodiments herein. Generally the client must have a public/private key pair and some kind of way to verify the identities that it can and should trust. Thus, anyone can use this sequence with just about any trusted entity in some embodiments.

Figure 7:
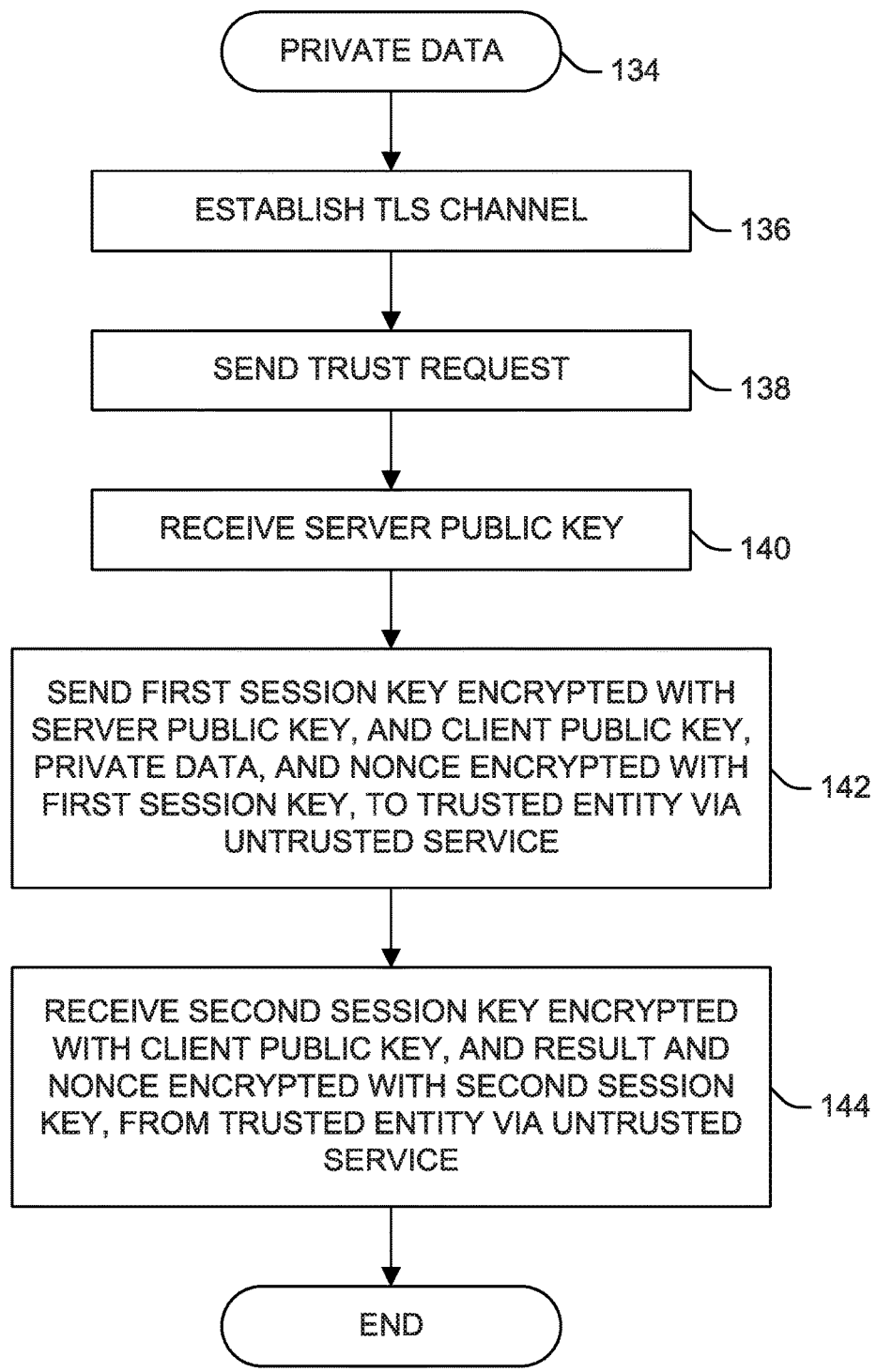
FIG. 7 is a flow chart for one embodiment at a client.

Referring to FIG. 7, a sequence 134 that may be implemented in the client, may be implemented in software, firmware and/or hardware. In software and firmware embodiments, it may be executed by one or more non-transitory computer readable media such as magnetic, optical, or semiconductor storages.

Program code, or instructions, may be stored in, for example, volatile and/or non-volatile memory, such as storage devices and/or an associated machine readable or machine accessible medium including, but not limited to, solid-state memory, hard-drives, floppy-disks, optical storage, tapes, flash memory, memory sticks, digital video disks, digital versatile disks (DVDs), etc., as well as more exotic mediums, such as machine-accessible biological state preserving storage. A machine readable medium may include any mechanism for storing, transmitting, or receiving information in a form readable by a machine, and the medium may include a medium through which the program code may pass, such as antennas, optical fibers, communications interfaces, etc. Program code may be transmitted in the form of packets, serial data, parallel data, etc., and may be used in a compressed or encrypted format.

The sequence 134 may begin by establishing a TLS channel as indicated in block 136 with a trusted execution environment or other trusted entity. Then the trust request is sent as indicated in block 138. A trust request may include the public key of the client device. The server receives the public key from the client device as indicated in block 140. The server responds by sending an encrypted server public key, session key, client public key, private data and a nonce to the trusted entity via an untrusted service as indicated in block 142. Then the client receives the encrypted client public key, session key, result and nonce, as indicated in block 144.

Figure 8:
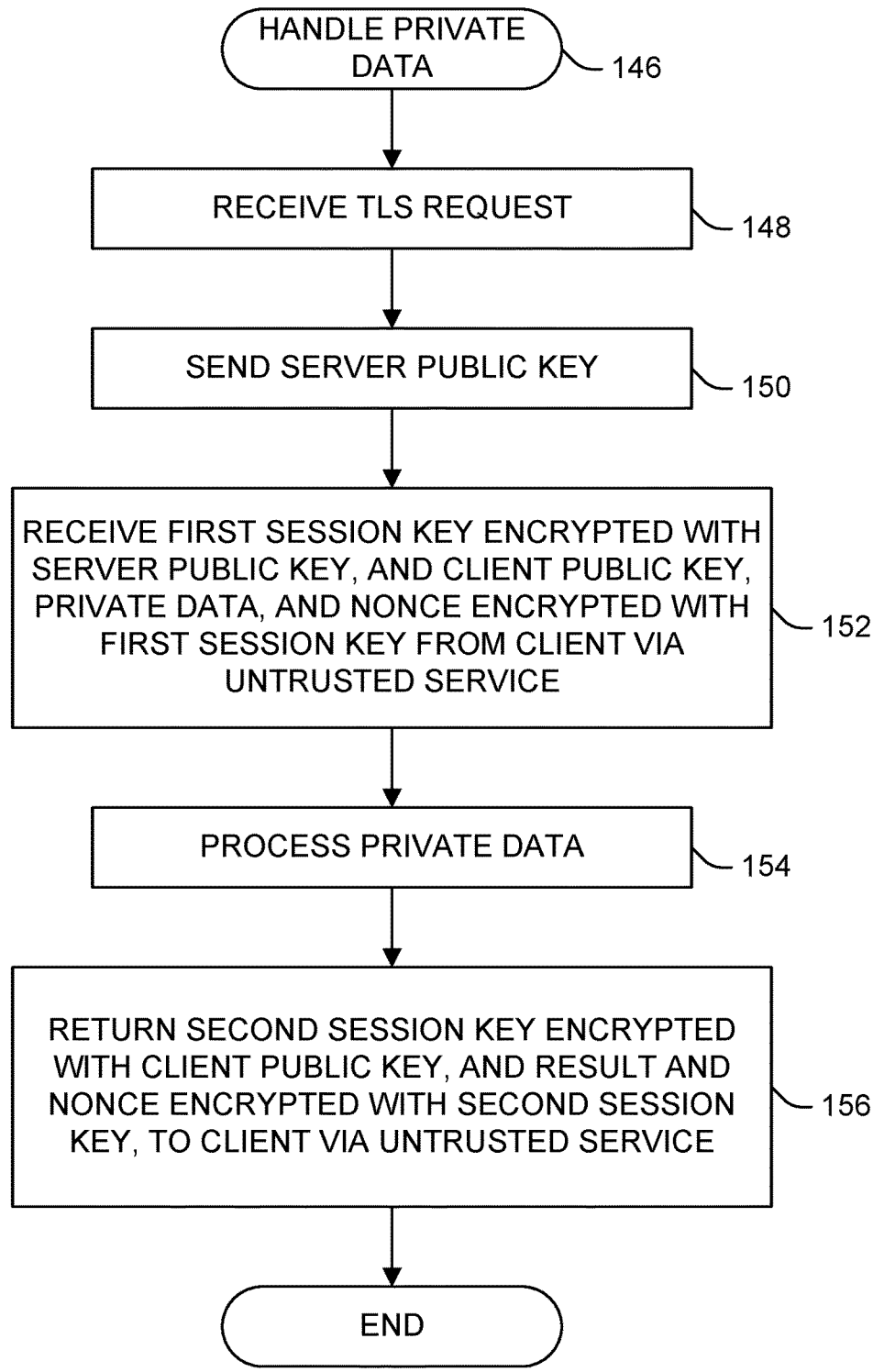
FIG. 8 is a flow chart for one embodiment at the server.

Corresponding activities in the server are indicated in FIG. 8 by the sequence 146. The sequence 146 may be implemented in software, firmware and/or hardware. In software and firmware embodiments, it may be implemented by computer executed instructions stored in one or more non-transitory computer readable media such as magnetic, optical or semiconductor storages.

The sequence 146 may begin by receiving the TLS request for the client device, as indicated in block 148. Then the server may send its public key as indicated in block 150. Next, the server receives the encrypted data, server and client public keys and a nonce, as indicated in block 152. The server processes the private data as indicated in block 154. Then, the server returns the encrypted client public key, session key, result and nonce, as indicated in block 156.

Figure 9:
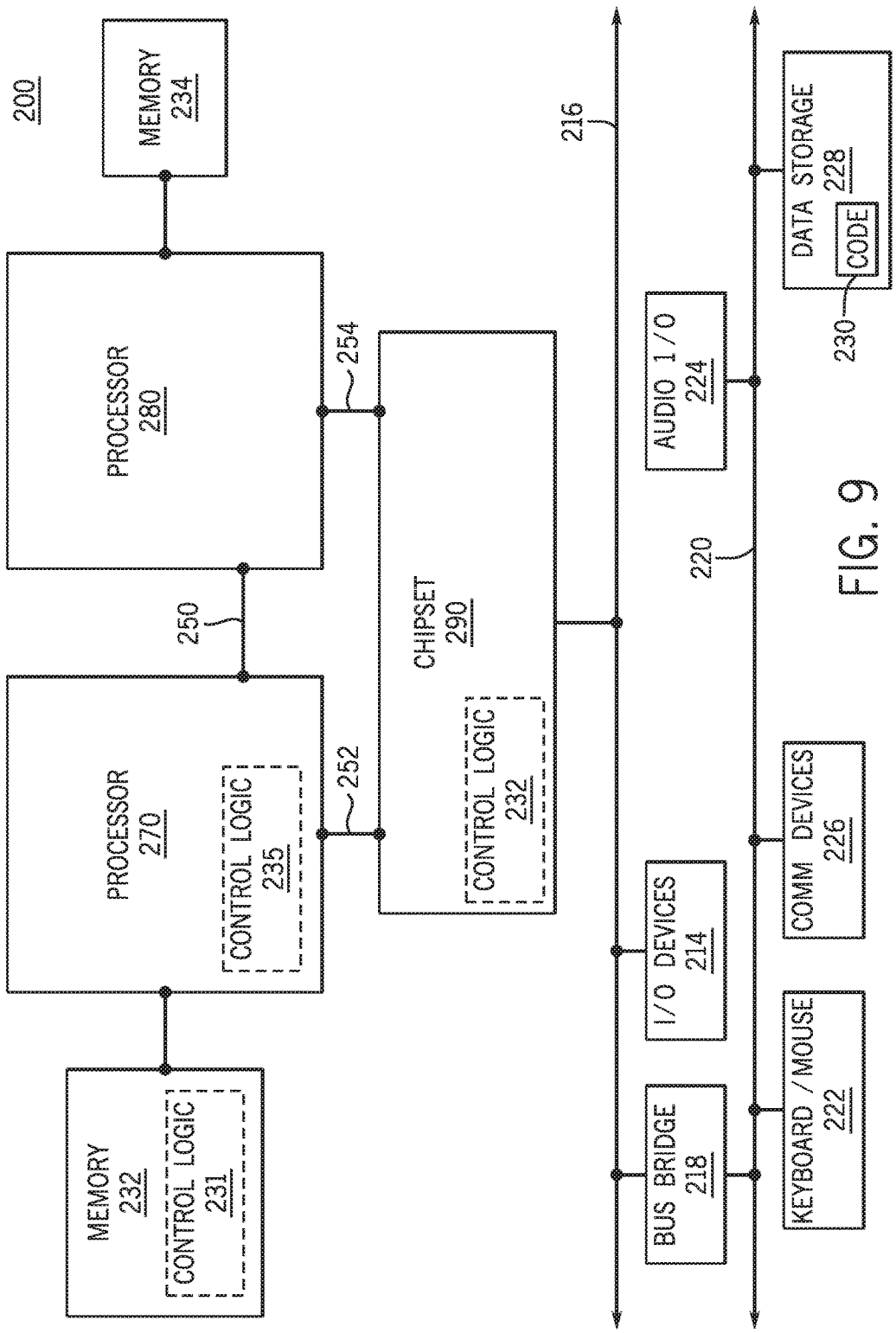
FIG. 9 is a system depiction for one embodiment.

Embodiments may be implemented in many different system types. Referring now to FIG. 9, shown is a block diagram of a system in accordance with an embodiment which may be found in a desktop, laptop, mobile internet device, mobile computing node, smartphone, cell phone, radio, fixed computing node, and the like. Multiprocessor system 200 is a point-to-point interconnect system, and includes a first processor 270 and a second processor 280 coupled via a point-to-point interconnect 250. Each of processors 270 and 280 may be multicore processors. The term "processor" may refer to any device or portion of a device that processes electronic data from registers and/or memory to transform that electronic data into other electronic data that may be stored in registers and/or memory. First processor 270 may include a memory controller hub (MCH) and point-to-point (P-P) interfaces. Similarly, second processor 280 may include a MCH and P-P interfaces. The MCHs may couple the processors to respective memories, namely memory 232 and memory 234, which may be portions of main memory (e.g., a dynamic random access memory (DRAM)) locally attached to the respective processors. First processor 270 and second processor 280 may be coupled to a chipset 290 via P-P interconnects, respectively. Chipset 290 may include P-P interfaces. Furthermore, chipset 290 may be coupled to first bus 216 via an interface. Various input/output (I/O) devices 214 may be coupled to first bus 216, along with a bus bridge 218, which couples first bus 216 to a second bus 220. Various devices may be coupled to second bus 220 including, for example, keyboard/mouse 222, communication devices 226, and data storage unit 228 such as a disk drive or other mass storage device, which may include code 230, in one embodiment. Code may be included in one or more memories including memory 228, 232, 234, memory coupled to system 200 via a network, and the like. Further, an audio I/O 224 may be coupled to second bus 220.

Embodiments may be implemented in code and may be stored on at least one storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as DRAMs, static random access memories (SRAMs), erasable programmable read-only memories (EPROMs), flash memories, electrically erasable programmable read-only memories (EEPROMs), magnetic or optical cards, or any other type of media suitable for storing electronic instructions.

Embodiments may be described herein with reference to data such as instructions, functions, procedures, data structures, application programs, configuration settings, code, and the like. Such instructions are included in, for example, FIGS. 7 and 8 and may be stored in (or distributed across) various locations such as locations 232, 231, 235, 236, 230, and/or 228, and the like. When the data is accessed by a machine, the machine may respond by performing tasks, defining abstract data types, establishing low-level hardware contexts, and/or performing other operations, as described in greater detail herein. The data may be stored in volatile and/or non-volatile data storage. The terms "code" or "program" covers a broad range of components and constructs, including applications, drivers, processes, routines, methods, modules, and subprograms and may refer to any collection of instructions which, when executed by a processing system, performs a desired operation or operations. In addition, alternative embodiments may include processes that use fewer than all of the disclosed operations, processes that use additional operations, processes that use the same operations in a different sequence, and processes in which the individual operations disclosed herein are combined, subdivided, or otherwise altered.

In one embodiment, use of the term control logic includes hardware, such as transistors, registers, or other hardware, such as programmable logic devices (235). However, in another embodiment, logic also includes software or code (231). Such logic may be integrated with hardware, such as firmware or micro-code (236). A processor or controller may include control logic intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All optional features of apparatus(s) described above may also be implemented with respect to method(s) or process(es) described herein. While the present invention has been described with respect to a limited number of embodiments, those skilled in the art will appreciate numerous modifications and variations therefrom. It is intended that the appended claims cover all such modifications and variations as fall within the true spirit and scope of this present invention.

The following clauses and/or examples pertain to further embodiments:

At least one machine readable media comprising instructions that when executed by a processor perform a sequence comprising establishing a secure channel with a trusted party in a cloud via an untrusted cloud service provider, exchanging public keys with the trusted party without disclosing the keys to the provider, sending encrypted data via the secure channel through the provider for processing by the trusted party separately from the provider, and receiving encrypted results of said processing from the trusted party via said secure channel through the provider. The media may further store instructions to receive a public key from the trusted party. The media may further store instructions to use said public key to encrypt said data before sending said data to said trusted party. The media may include sending an encrypted client public key to said party. The media may include receiving the results encrypted with said client public key. The media may include the trusted party is a third party. The media may include at least one media wherein the trusted party is a trusted environment. The media may include providing private data with the party's public key to the trusted party encrypted with the client's public key and a session key together with a nonce encrypted with the session key.

In another example embodiment at least one machine readable media comprising instructions that when executed by a processor perform a sequence comprising establishing a secure channel with a client via an untrusted cloud service provider, exchanging keys with the client, receiving encrypted data via the secure channel, processing by the encrypted data, and sending encrypted results of said processing via said secure channel through the untrusted cloud service provider. The at least one media further store instructions to receive a public key from the client. The at least one media further store instructions to use said public key to encrypt said data before sending said data to said client. The at least one media includes sending an encrypted server public key to said client. The at least one media includes sending the results encrypted with said client public key.

Another example embodiment may be an apparatus comprising a processor to establish a secure channel with a trusted party in a cloud via an untrusted cloud service provider, exchange keys with the trusted party, send encrypted data via the secure channel for processing by the trusted party, and receive encrypted results of said processing from the trusted party via said secure channel, and a storage coupled to said processor. The apparatus may include said processor to receive a public key from the trusted party. The apparatus may include said processor to use said public key to encrypt said data before sending said data to said trusted party. The apparatus may include said processor to send an encrypted client public key to said party. The apparatus may include said processor to receive the results encrypted with said client public key.

In yet another example embodiment may be an apparatus comprising a processor to establish a secure channel with a client via an untrusted cloud service provider, exchange keys with the client, receive encrypted data via the secure channel, process by the encrypted data, and send encrypted results of said processing via said secure channel through the untrusted cloud service provider, and a storage coupled to said apparatus. The apparatus may include said processor to receive a public key from the client. The apparatus may include said processor to use said public key to encrypt said data before sending said data to said client. The apparatus may include said processor to send an encrypted server public key to said client. The apparatus may include said processor to send the results encrypted with said client public key. The apparatus may include a cloud server. The apparatus may include a trusted execution environment. The apparatus may include said server is a third party, relative to said client and a service provider to said client, in the cloud.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
    establishing a secure channel with a trusted party in a cloud via an untrusted cloud service provider;
    receiving a trusted party public key from the trusted party, without disclosing the trusted party public key to the provider, via the secure channel through the provider;
    sending encrypted private data via the secure channel through the provider for processing by the trusted party separately from the provider, wherein sending said encrypted private data comprises sending, to the trusted party, a first session key encrypted using the trusted party public key, and a client public key, the private data, and an nonce all encrypted together using the first session key;
    receiving encrypted results of said processing from the trusted party via said secure channel through the provider, wherein receiving said encrypted results comprises receiving, from the trusted party, a second session key encrypted using the client public key, and the results of said processing and the nonce both encrypted together using the second session key; and obtaining decrypted results of said processing, wherein obtaining said decrypted results comprises decrypting the second session key using a client private key, and decrypting the results of said processing and the nonce using the second session key.

2. The method of claim 1 wherein the trusted party is a third party.

3. The method of claim 1 wherein the trusted party is a trusted environment.

4. At least one non-transitory machine readable medium comprising a plurality of instructions that, in response to being executed on a computing device, cause the computing device to carry out a sequence comprising:

establishing a secure channel with a trusted party in a cloud via an untrusted cloud service provider;

receiving a trusted party public key from the trusted party without disclosing the trusted party public key to the provider, via the secure channel through the provider;

sending encrypted private data via the secure channel through the provider for processing by the trusted party separately from the provider, wherein sending said encrypted private data comprises sending to the trusted party, a first session key encrypted using the trusted party public key, and a client public key, the private data, and an nonce all encrypted together using the first session key;

receiving encrypted results of said processing from the trusted party via said secure channel through the provider, wherein receiving said encrypted results comprises receiving, from the trusted party, a second session key encrypted using the client public key, and the results of said processing and the nonce both encrypted together using the second session key; and obtaining decrypted results of said processing, wherein obtaining said decrypted results comprises decrypting the second session key using a client private key, and decrypting the results of said processing and the nonce using the second session key.

5. The medium of claim 4 wherein the trusted party is a third party.

6. The medium of claim 4 wherein the trusted party is a trusted environment.

7. An apparatus comprising a non-transitory computer readable medium and a processor coupled to said medium, said medium storing instructions which when executed by the processor are configured to:

establish a secure channel with a trusted party in a cloud via an untrusted cloud service provider;

receive a trust party public key from the trusted party, without disclosing the trusted party public key to the provider, via the secure channel through the provider;

send encrypted private data via the secure channel through the provider for processing by the trusted party separately from the provider, wherein sending said encrypted private data comprises sending, to the trusted party, a first session key encrypted using the trusted party public key, and a client public key, the private data, and a nonce all encrypted together using the first session key;

receive encrypted results of said processing from the trusted party via said secure channel through the provider wherein receiving said encrypted results comprises receiving, from the trusted party, a second session key encrypted using the client public key, and the results of said processing and the nonce both encrypted together using the second session key; and obtain decrypted results of said processing, wherein obtaining said decrypted results comprises decrypting the second session key using a client private key, and decrypting the results of said processing and the nonce using the second session key.

8. The apparatus of claim 7 including an enterprise client device to establish a secure channel through an enterprise server to said trusted party.

9. The apparatus of claim 7 wherein the trusted party is a third party.

10. The apparatus of claim 7 wherein the trusted party is a trusted environment.

11. A method comprising:

establishing a secure channel with a client in a cloud via an untrusted cloud service provider;

sending a trusted party public key to the client, without disclosing the trusted party public key to the provider, via the secure channel;

receiving encrypted private data from the client via the secure channel through the provider, wherein receiving said encrypted private data comprises receiving, from the client, a first session key encrypted using the trusted party public key, and a client public key, the private data, and a nonce all encrypted together using the first session key;

processing the encrypted private data separately from the provider, wherein processing said encrypted private data comprises decrypting the first session key using a trusted party private key, decrypting the client public key, the private data, and the nonce using the first session key, and processing the decrypted private data so as to obtain results of said processing; and sending encrypted results of said processing to the client via said secure channel through the provider, wherein sending said encrypted results comprises sending, to the client, a second session key encrypted using the client public key, and the results of said processing and the nonce both encrypted together using the second session key.

12. The method of claim 11 wherein the trusted party is a third party.

13. The method of claim 11 wherein the trusted party is a trusted environment.

14. At least one non-transitory machine readable medium comprising a plurality of instructions that, in response to being executed on a computing device, cause the computing device to carry out a method comprising:

establishing a secure channel with a client in a cloud via an untrusted cloud service provider;

sending a trusted party public key to the client, without disclosing the trusted party public key to the provider, via the secure channel;

receiving encrypted private data via the secure channel, through the provider, wherein receiving said encrypted private data comprises receiving, from the client, a first session key encrypted using the trusted party public key, and a client public key, the private data, and a nonce all encrypted together using the first session key;

processing the encrypted private data separately from the provider, wherein processing said encrypted private data comprises decrypting the first session key using a trusted party private key, decrypting the client public key, the private data, and the nonce using the first session key, and processing the decrypted private data so as to obtain results of said processing; and sending encrypted results of said processing via said secure channel through the provider, wherein sending said encrypted results comprises sending, to the client, a second session key encrypted using the client public key, and the results of said processing and the nonce both encrypted together using the second session key.

15. The medium of claim 14 wherein the trusted party is a third party.

16. The medium of claim 14 wherein the trusted party is a trusted environment.

17. An apparatus comprising a non-transitory computer readable medium and a processor coupled to said medium, said medium storing instructions which when executed by the processor are configured to:

establish a secure channel with a client in a cloud via an untrusted cloud service provider;

send a trusted party public key to the client, without disclosing the trusted party public key to the provider, via the secure channel;

receive encrypted private data from the client via the secure channel through the provider, wherein receiving said encrypted private data comprises receiving, from the client, a first session key encrypted using the trusted party public key, and a client public key, the private data, and a nonce all encrypted together using the first session key;

processes the encrypted private data separately from the provider, wherein processing said encrypted private data comprises decrypting the first session key using a trusted party private key, decrypting the client public key, the private data, and the nonce using the first session key, and processing the decrypted private data so as to obtain results of said processing; and send encrypted results of said processing to the client via said secure channel through the provider, wherein sending said encrypted results comprises sending, to the client, a second session key encrypted using the client public key, and the results of said processing and the nonce both encrypted together using the second session key.

18. The apparatus of claim 12 including an enterprise server to establish a secure channel through an enterprise client device to said client.

19. The apparatus of claim 12 wherein the trusted party is a third party.

20. The apparatus of claim 12 wherein the trusted party is a trusted environment.

\* \* \* \* \*